(12) United States Patent
Hamada et al.

(10) Patent No.: US 12,147,246 B2
(45) Date of Patent: Nov. 19, 2024

(54) SYSTEM FOR AND METHOD OF CONTROLLING BEHAVIOR OF WATERCRAFT

(71) Applicant: YAMAHA HATSUDOKI KABUSHIKI KAISHA, Iwata (JP)

(72) Inventors: Satoru Hamada, Shizuoka (JP); Ryosuke Saito, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 239 days.

(21) Appl. No.: 17/885,600

(22) Filed: Aug. 11, 2022

(65) Prior Publication Data
US 2023/0075324 A1 Mar. 9, 2023

(30) Foreign Application Priority Data

Sep. 6, 2021 (JP) ................. 2021-144774

(51) Int. Cl.
G05D 1/00 (2024.01)
B63B 79/10 (2020.01)
B63B 79/40 (2020.01)

(52) U.S. Cl.
CPC ........... G05D 1/0875 (2013.01); B63B 79/10 (2020.01); B63B 79/40 (2020.01)

(58) Field of Classification Search
CPC ........ G05D 1/0875; G05D 1/00; B63B 79/10; B63B 79/40; B63H 25/42; B63H 20/08
USPC .......................................................... 701/21
See application file for complete search history.

(56) References Cited

U.S. PATENT DOCUMENTS

| | | | | |
|---|---|---|---|---|
| 4,925,416 | A * | 5/1990 | Oishi | B63H 21/213 74/480 B |
| 6,997,763 | B2 * | 2/2006 | Kaji | F02B 61/045 440/87 |
| 8,740,659 | B2 * | 6/2014 | Kuriyagawa | B63H 21/213 440/1 |
| 9,650,119 | B2 * | 5/2017 | Morikami | B63B 79/10 |
| 9,919,781 | B1 * | 3/2018 | Andrasko | B63B 79/10 |
| 10,023,284 | B1 * | 7/2018 | Nakamura | B63H 21/17 |
| 2021/0188406 | A1 * | 6/2021 | Nakatani | B63H 20/10 |

FOREIGN PATENT DOCUMENTS

JP 2021-095072 A 6/2021

* cited by examiner

Primary Examiner — Shardul D Patel
(74) Attorney, Agent, or Firm — Keating & Bennett, LLP

(57) ABSTRACT

A controller is configured or programmed to obtain at least either of a pitch angle of a watercraft and an angular velocity of the pitch angle, obtain a present thrust of an outboard motor, and set a target thrust of the outboard motor based on the present thrust of the outboard motor and at least either of the pitch angle of the watercraft and the angular velocity of the pitch angle. The controller is configured or programmed to control a drive source such that a thrust of the outboard motor becomes the target thrust.

6 Claims, 8 Drawing Sheets

SYSTEM FOR AND METHOD OF CONTROLLING BEHAVIOR OF WATERCRAFT

CROSS REFERENCE TO RELATED APPLICATIONS

This application claims the benefit of priority to Japanese Patent Application No. 2021-144774 filed on Sep. 6, 2021. The entire contents of this application are hereby incorporated herein by reference.

BACKGROUND OF THE INVENTION

1. Field of the Invention

The present invention relates to a system for and a method of controlling a behavior of a watercraft.

2. Description of the Related Art

Chances are that pitching movement called "porpoising" occurs during high-speed navigation of a watercraft with installation of a marine propulsion device such as an outboard motor. A main reason for the occurrence of porpoising is as follows.

In high-speed navigation of the watercraft, the bow of the watercraft is elevated by a lift. When the bow of the watercraft is elevated, the center of lift is shifted rearward such that a moment acts on the watercraft to lower the bow. Accordingly, the bow of the watercraft is lowered. When the bow of the watercraft is lowered, the center of lift is shifted forward such that a moment acts on the watercraft to elevate the bow. Accordingly, the bow of the watercraft is elevated. Repetition of the motions described herein results in the occurrence of porpoising of the watercraft, that is, repetition of elevation and lowering of the bow.

A reduction in the rotational speed of an engine has been known as a technology for alleviating porpoising. Alternatively, as described in Japan Patent Application Publication No. 2021-95072, controlling the posture of a watercraft by lowering a trim tab has been known as a technology for alleviating porpoising. Both the technologies for alleviating porpoising described above inevitably cause a reduction in the velocity of the watercraft.

SUMMARY OF THE INVENTION

Preferred embodiments of the present invention each inhibit a reduction in velocity of a watercraft, and simultaneously alleviate porpoising.

A first preferred embodiment of the present invention relates to a system to control a behavior of a watercraft. The system includes an outboard motor, a pitch angle sensor, and a controller. The outboard motor includes a propeller shaft and a drive source. The drive source drives the propeller shaft. The outboard motor is attachable to the watercraft. The pitch angle sensor detects at least either of a pitch angle of the watercraft and an angular velocity of the pitch angle. The controller is configured or programmed to control the drive source such that a thrust of the outboard motor varies.

The controller is configured or programmed to obtain at least either of the pitch angle of the watercraft and the angular velocity of the pitch angle, obtain a present thrust of the outboard motor, set a target thrust of the outboard motor based on the present thrust of the outboard motor and at least either of the pitch angle of the watercraft and the angular velocity of the pitch angle, and control the drive source such that the thrust of the outboard motor becomes the target thrust.

A second preferred embodiment of the present invention relates to a method of controlling a behavior of a watercraft. The watercraft includes an outboard motor. The outboard motor includes a propeller shaft and a drive source. The drive source drives the propeller shaft. The method includes obtaining at least either of a pitch angle of the watercraft and an angular velocity of the pitch angle, obtaining a present thrust of the outboard motor, setting a target thrust of the outboard motor based on the present thrust of the outboard motor and at least either of the pitch angle of the watercraft and the angular velocity of the pitch angle, and controlling the drive source such that the thrust of the outboard motor becomes the target thrust.

A third preferred embodiment of the present invention relates to a system to control a behavior of a watercraft. The system includes a marine propulsion device, a pitch angle sensor, and a controller. The marine propulsion device includes a propeller shaft and a drive source. The drive source drives the propeller shaft. The marine propulsion device is attachable to the watercraft. The pitch angle sensor detects at least either of a pitch angle of the watercraft and an angular velocity of the pitch angle. The controller is configured or programmed to control the drive source such that a thrust of the marine propulsion device varies.

The controller is configured or programmed to obtain the at least either of the pitch angle of the watercraft and the angular velocity of the pitch angle, obtain a present thrust of the marine propulsion device, set a target thrust of the marine propulsion device based on the present thrust of the marine propulsion device and at least either of the pitch angle of the watercraft and the angular velocity of the pitch angle, and control the drive source such that the thrust of the marine propulsion device becomes the target thrust.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
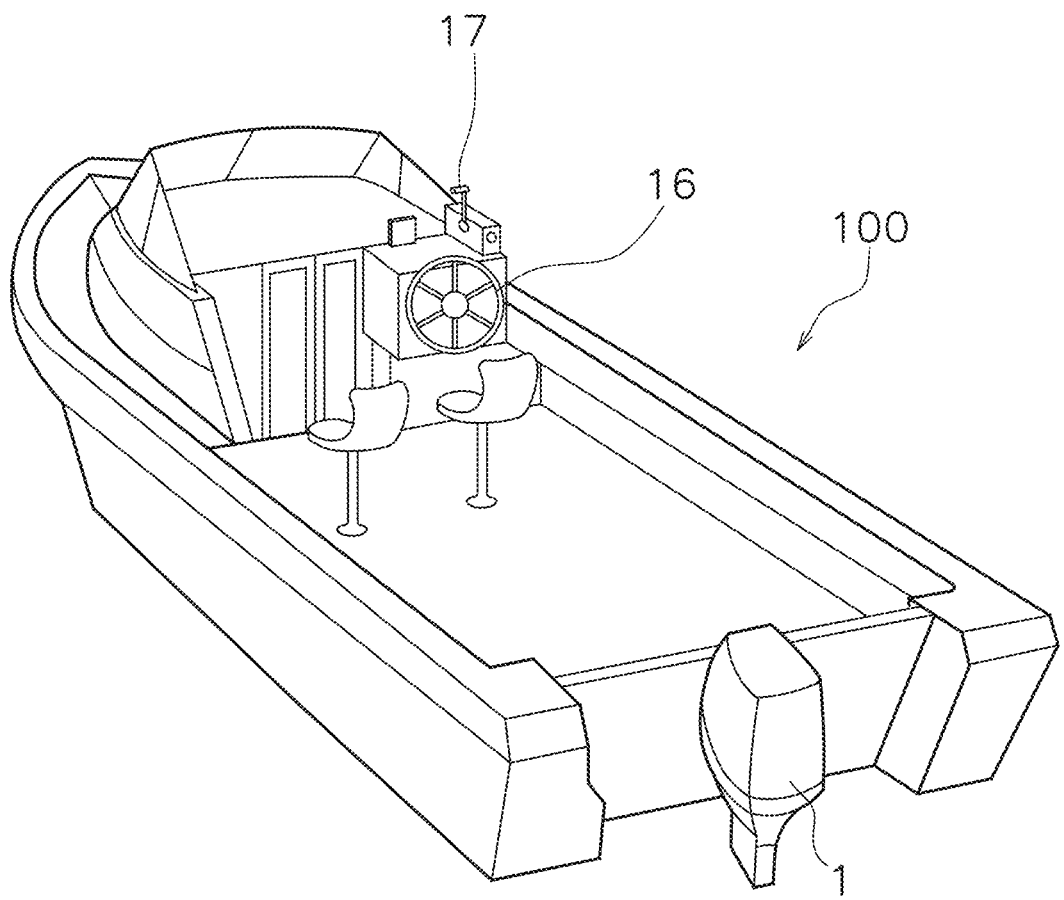
FIG. 1 is a perspective view of a watercraft according to a preferred embodiment of the present invention.
Figure 2:
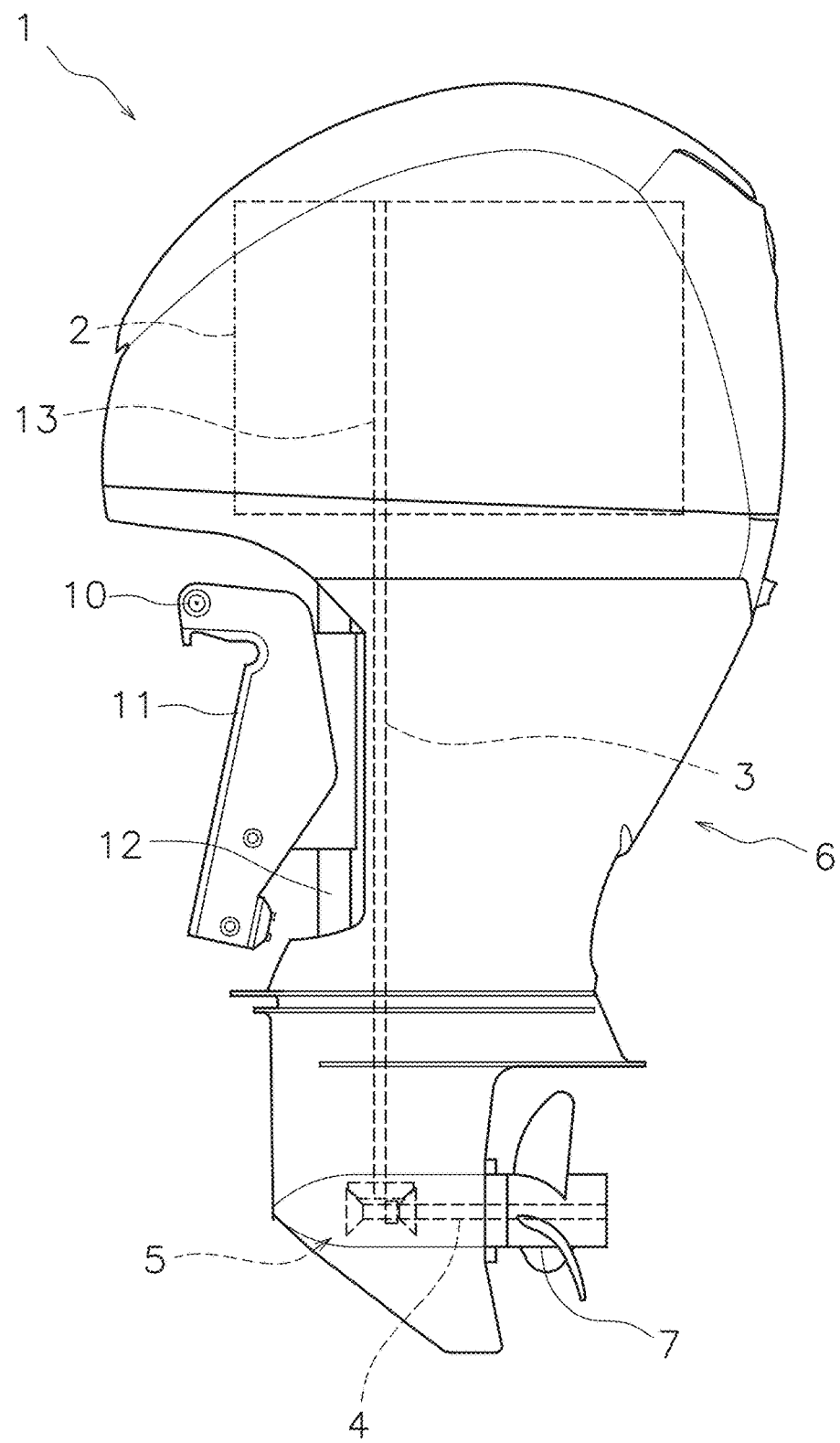
FIG. 2 is a side view of an outboard motor.

Preferred embodiments of the present invention will be explained with reference to drawings. FIG. 1 is a perspective view of a watercraft 100 according to a preferred embodiment of the present invention. The watercraft 100 is provided with an outboard motor 1 attached to the stern thereof. The outboard motor 1 generates a thrust to propel the watercraft 100. FIG. 2 is a side view of the outboard motor 1. The outboard motor 1 is attached to the watercraft 100 by a bracket 11. The bracket 11 supports the outboard motor 1 such that the outboard motor 1 is rotatable about a trim shaft 10. The trim shaft 10 extends in a right-and-left direction of the outboard motor 1. The bracket 11 supports the outboard motor 1 such that the outboard motor 1 is rotatable about a steering shaft 12. The steering shaft 12 extends in an up-and-down direction of the outboard motor 1.

The outboard motor 1 includes a drive source 2, a drive shaft 3, a propeller shaft 4, a shift mechanism 5, and a housing 6. The drive source 2 generates the thrust to propel the watercraft 100. The drive source 2 is, for instance, an internal combustion engine. The drive source 2 includes a crankshaft 13. The crankshaft 13 extends in the up-and-down direction of the outboard motor 1.

The drive shaft 3 is connected to the crankshaft 13. The drive shaft 3 extends in the up-and-down direction of the outboard motor 1. The propeller shaft 4 extends in a back-and-forth direction of the outboard motor 1. The propeller shaft 4 is connected to the drive shaft 3 through the shift mechanism 5. A propeller 7 is attached to the propeller shaft 4. The shift mechanism 5 includes gears and a clutch to switch between forward movement and rearward movement. The shift mechanism 5 switches the direction of rotation transmitted from the drive shaft 3 to the propeller shaft 4. The housing 6 accommodates the drive source 2, the drive shaft 3, the propeller shaft 4, and the shift mechanism 5.

Figure 3:
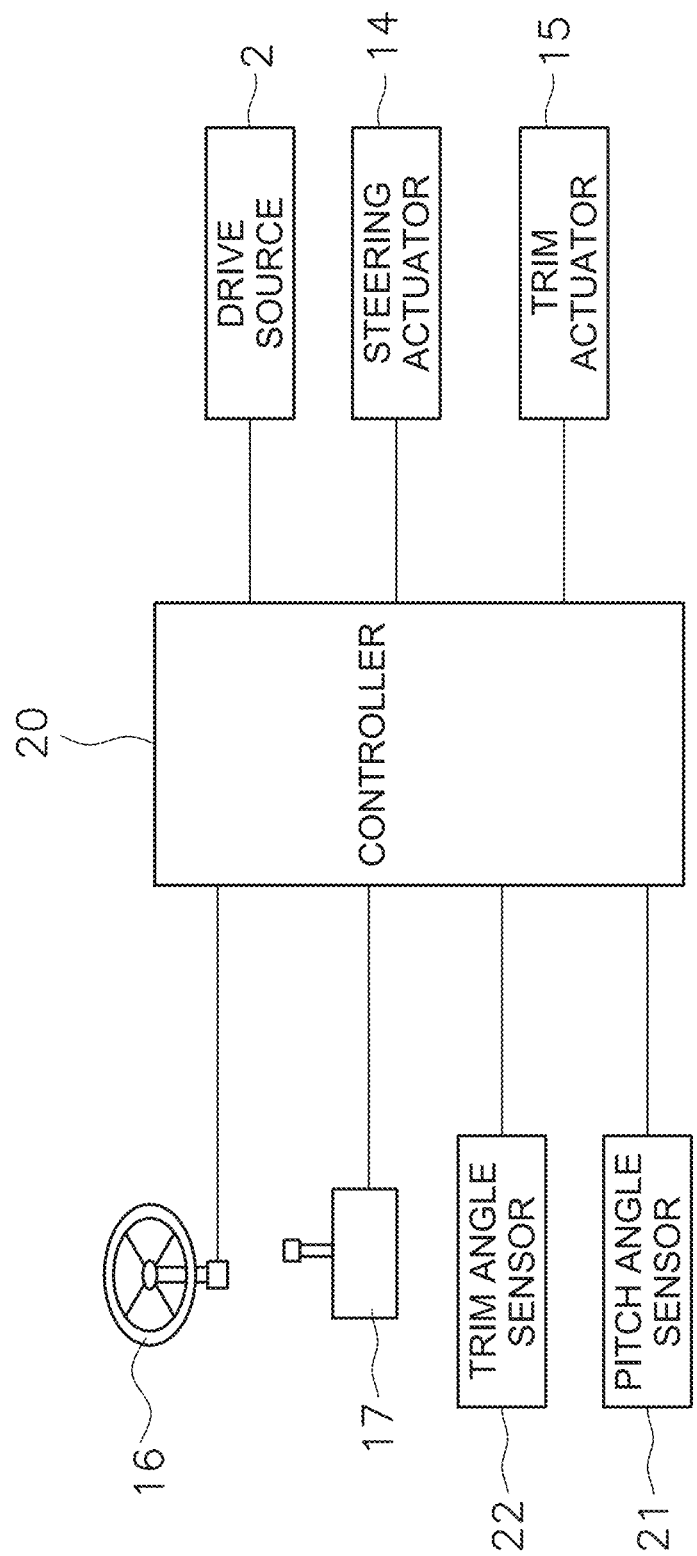
FIG. 3 is a schematic diagram for showing a configuration of a control system for the watercraft.

FIG. 3 is a schematic diagram for showing a configuration of a control system for the watercraft 100. As shown in FIG. 3, the outboard motor 1 includes a steering actuator 14 and a trim actuator 15. The steering actuator 14 rotates the outboard motor 1 about the steering shaft 12. The steering actuator 14 is, for instance, an electric motor. However, the steering actuator 14 may be another type of actuator such as an electric cylinder, a hydraulic motor, or a hydraulic cylinder.

The trim actuator 15 rotates the outboard motor 1 about the trim shaft 10. The trim actuator 15 is, for instance, an electric motor. However, the trim actuator 15 may be another type of actuator such as an electric cylinder, a hydraulic motor, or a hydraulic cylinder. The trim actuator 15 rotates the outboard motor 1 about the trim shaft 10 such that the outboard motor 1 is caused to perform a trim motion in a trim-up direction and a trim-down direction.

The control system includes a steering member 16 and a throttle operating member 17. The steering member 16 and the throttle operating member 17 are provided in a cockpit of the watercraft 100. The steering member 16 is operable by an operator to manipulate a turning direction of the watercraft 100. The steering member 16 includes, for instance, a steering wheel. However, the steering member 16 may include another member such as a joystick.

The throttle operating member 17 includes, for instance, a throttle lever. The throttle operating member 17 is operable by the operator to regulate the magnitude of the thrust generated by the outboard motor 1. The throttle operating member 17 is also operable by the operator to switch the direction of the thrust generated by the outboard motor 1 between forward and rearward directions.

The control system includes a controller 20. The controller 20 includes a processor such as a CPU and memories such as a RAM and a ROM. The controller 20 stores programs and data to control the outboard motor 1. The controller 20 may include a plurality of controllers provided as discrete components.

The controller 20 is communicably connected to the drive source 2, the steering actuator 14, and the trim actuator 15. The controller 20 controls the drive source 2 in accordance with the operation of the throttle operating member 17. The output rotational speed of the drive source 2 is thus controlled. The controller 20 controls the steering actuator 14 in accordance with the operation of the steering member 16. The rudder angle of the outboard motor 1 is thus controlled.

The control system includes a pitch angle sensor 21 and a trim angle sensor 22. The pitch angle sensor 21 detects a pitch angle of the watercraft 100 and an angular velocity of the pitch angle (hereinafter referred to as "pitch angular velocity"). The pitch angle indicates a tilt angle of the up-and-down direction of the watercraft 100 relative to a horizontal direction. The pitch angle of the watercraft 100 and the pitch angular velocity thereof are exemplified as motion information indicating up-and-down directional motions of the bow of the watercraft 100.

The pitch angle sensor 21 includes, for instance, an IMU (Inertial Measurement Unit). The pitch angle sensor 21 outputs a pitch angle signal indicating the pitch angle of the watercraft 100 and the pitch angular velocity thereof. The trim angle sensor 22 detects a trim angle of the outboard motor 1. The trim angle indicates a rotational angle of the outboard motor 1 about the trim shaft 10 from a predetermined reference direction (e.g., vertical direction). The trim angle sensor 22 outputs a trim angle signal indicating the trim angle of the outboard motor 1.

Figure 4:
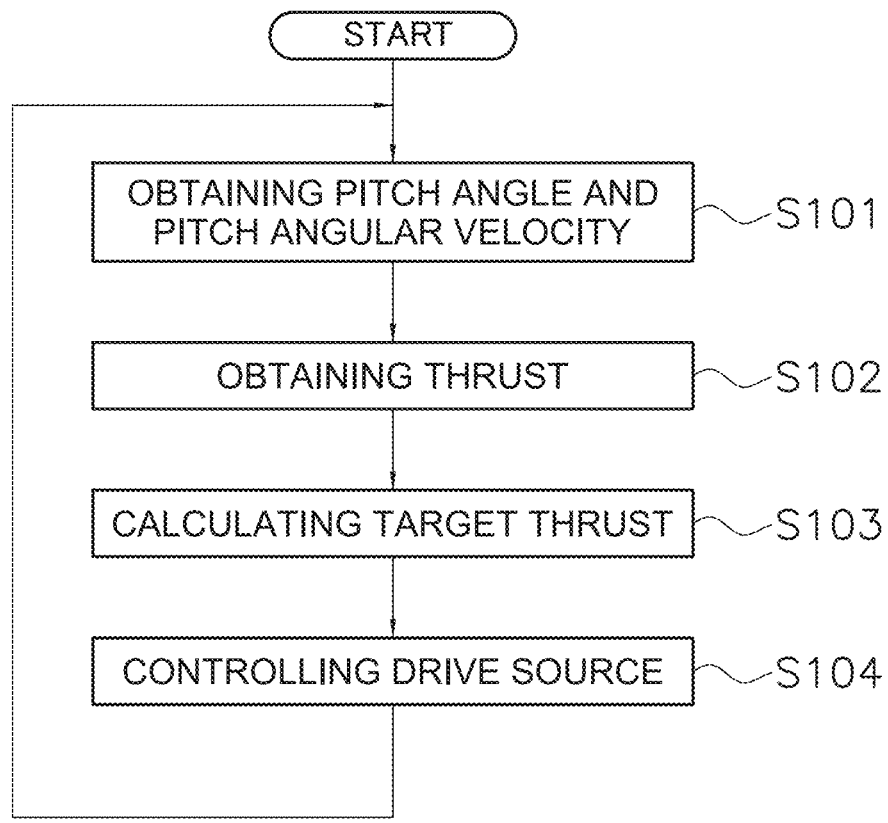
FIG. 4 is a flowchart for showing a series of processes of porpoising inhibiting control.

The controller 20 controls the thrust generated by the outboard motor 1 based on the pitch angle of the watercraft 100 and the pitch angular velocity thereof to execute porpoising inhibiting control to inhibit porpoising. The porpoising inhibiting control will be hereinafter explained. FIG. 4 is a flowchart showing a series of processes of the porpoising inhibiting control.

As shown in FIG. 4, in step S101, the controller 20 obtains a pitch angle and a pitch angular velocity thereof. The controller 20 receives a pitch angle signal and obtains the pitch angle and the pitch angular velocity thereof from the pitch angle signal.

In step S102, the controller 20 obtains a thrust. The controller 20 calculates a present thrust generated by the outboard motor 1, for instance, from the output rotational speed of the drive source 2.

In step S103, the controller 20 calculates a target thrust. The controller 20 sets the target thrust based on the pitch angle of the watercraft 100, the pitch angular velocity thereof, and the present thrust generated by the outboard motor 1 so as to inhibit a pitch directional motion of the bow of the watercraft 100. The controller 20 calculates a target amount of change in thrust THt based on the following formula (1).

$$THt = a1 \times (\theta p - \theta p^*) + a2 \times d\theta p + a3 \times (THc - TH^*) \qquad (1)$$

"θp" indicates the pitch angle of the watercraft 100. "dθp" indicates the pitch angular velocity of the watercraft 100. "THc" indicates the present thrust. "a1", "a2", and "a3" indicate predetermined coefficients that are set depending on the type and the posture of the watercraft 100 and those of the outboard motor 1. For example, the posture of the watercraft 100 is obtained from the pitch angle. The posture of the outboard motor 1 is obtained from the trim angle. "θp*" indicates a target pitch angle of the watercraft 100 in an equilibrium condition during navigation. "TH*" indicates a target thrust to be generated by the outboard motor 1 in the equilibrium condition during navigation. The controller 20 sets the target thrust based on the present thrust and the target amount of change in thrust THt. The target thrust periodically varies during the occurrence of porpoising of the watercraft 100.

In step S104, the controller 20 controls the drive source 2 such that the thrust generated by the outboard motor 1 becomes the target thrust. The controller 20 repeatedly executes the processes in steps S101 to S104.

Figure 5:
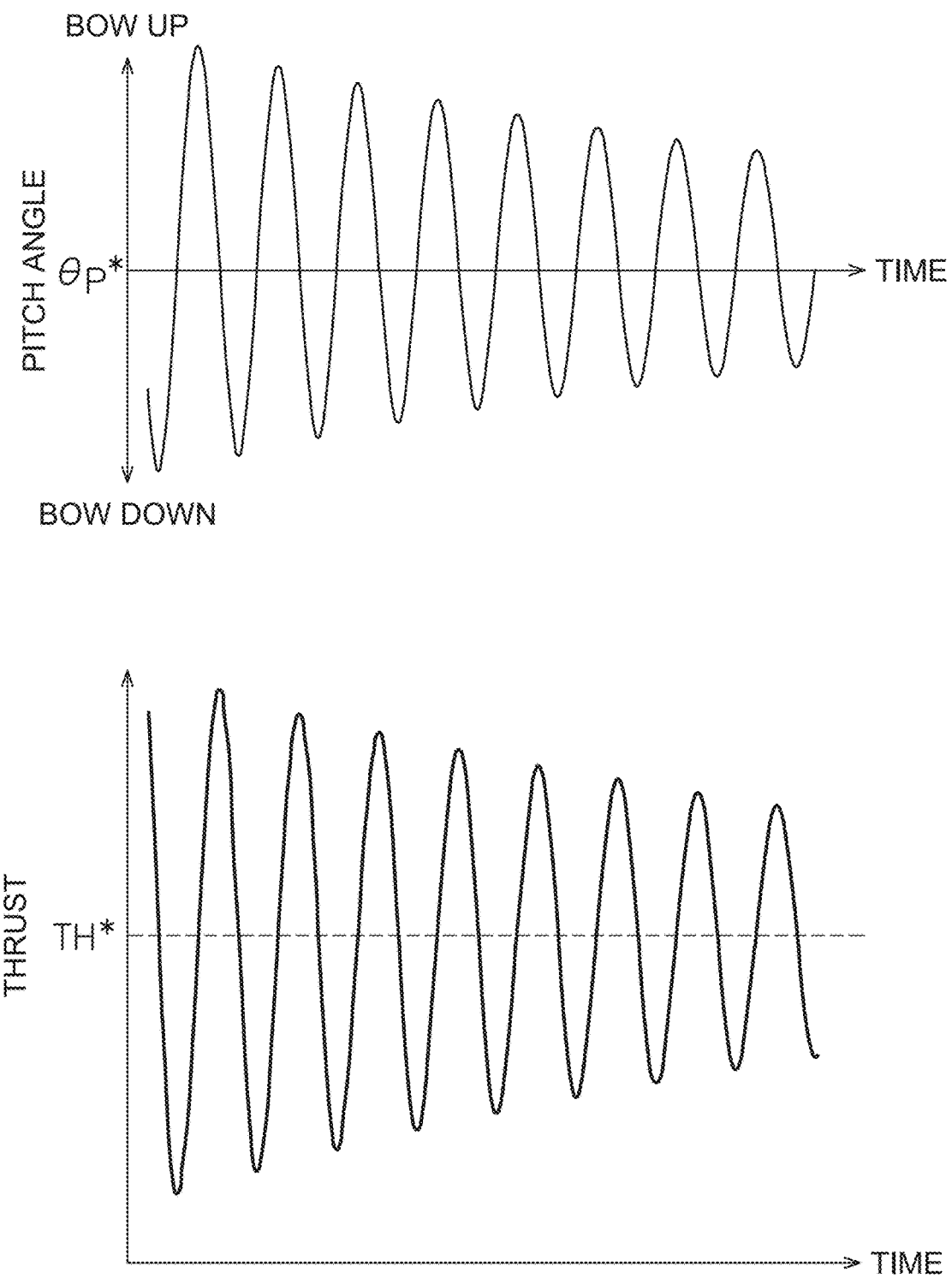
FIG. 5 includes a chart for showing a variation in a pitch angle of the watercraft during the occurrence of porpoising and a chart for showing a variation in a thrust caused by the porpoising inhibiting control.

FIG. 5 includes charts for showing a variation in a thrust caused by the porpoising inhibiting control with respect to variation in pitch angle of the watercraft 100 during the occurrence of porpoising. As shown in FIG. 5, during the occurrence of porpoising, the pitch angle of the watercraft 100 varies periodically. The pitch angle of the watercraft 100 periodically varies about the target pitch angle θp* in the equilibrium condition. In view of this, the controller 20 sets the target thrust to inhibit the pitch directional motion of the bow of the watercraft 100. Accordingly, as shown in FIG. 5, the thrust of the watercraft 100 periodically varies about the thrust TH* in the equilibrium condition. Consequently, as shown in FIG. 5, a variation in a pitch angle of the watercraft 100 becomes gradually smaller such that the occurrence of porpoising is inhibited.

It should be noted that the controller 20 may execute the porpoising inhibiting control described above when a predetermined start condition is satisfied. The start condition indicates the occurrence of porpoising of the watercraft 100. For example, the start condition includes periodic variation in pitch angle at about 0.1 Hz or greater.

In the control system for the outboard motor 1 according to a preferred embodiment of the present invention, the target thrust of the outboard motor 1 is set based on the present thrust of the outboard motor 1, the pitch angle of the watercraft 100, and the angular velocity of the pitch angle. Then, the drive source 2 is controlled such that the thrust of the outboard motor 1 becomes the target thrust. Accordingly, porpoising is alleviated. Consequently, a reduction in the velocity of the watercraft 100 is inhibited, and simultaneously porpoising is alleviated.

Figure 6A:
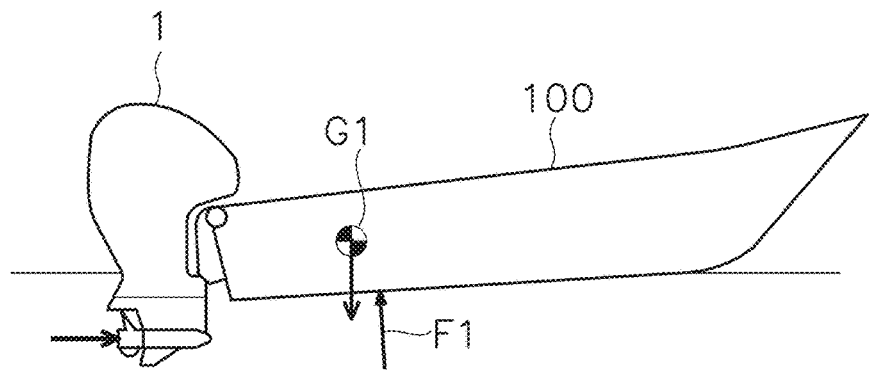
FIG. 6A is a diagram for showing an example of a behavior of the watercraft and a variation in a thrust of the outboard motor during the occurrence of porpoising.
Figure 6B:
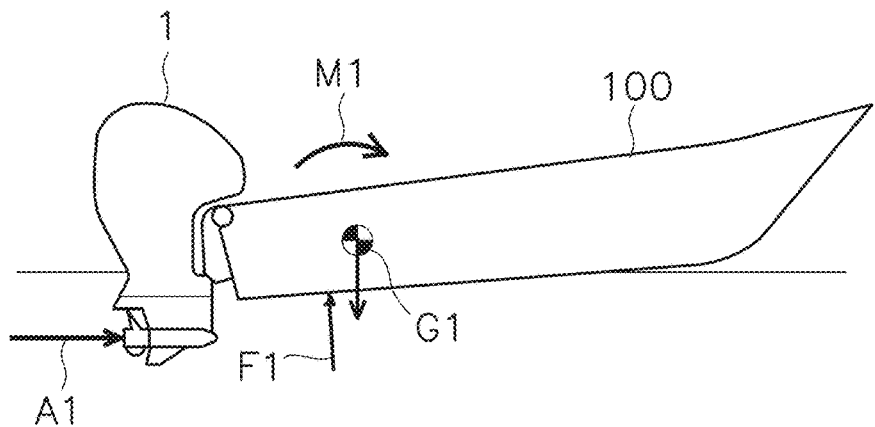
FIG. 6B is a diagram for showing the example of the behavior of the watercraft and a variation in a thrust of the outboard motor during the occurrence of porpoising.
Figure 6C:
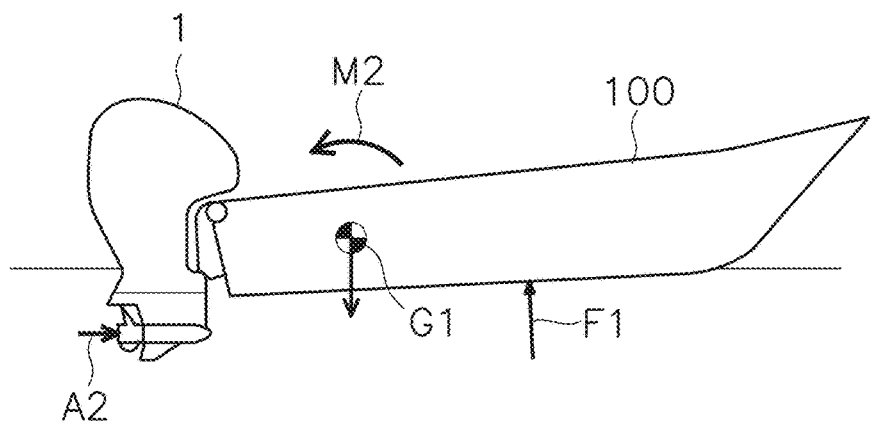
FIG. 6C is a diagram for showing the example of the behavior of the watercraft and a variation in a thrust of the outboard motor during the occurrence of porpoising.

For example, FIGS. 6A to 6C are diagrams for showing an example of the behavior of the watercraft 100 and a variation in a thrust generated by the outboard motor 1 during the occurrence of porpoising. During the occurrence of porpoising, as shown in FIG. 6A, a lift F1 acts on a position forward of a center-of-gravity G1 of the watercraft 100 such that the bow of the watercraft 100 is elevated. When the bow of the watercraft 100 is elevated as shown in FIG. 6B, the position on which the lift F1 acts is shifted aft of the center-of-gravity G1. Accordingly, a moment M1 acts on the watercraft 100 to lower the bow of the watercraft 100. At this time, during the porpoising inhibiting control, the controller 20 increases the thrust as indicated by arrow A1. Accordingly, a moment, which is generated by the thrust of the outboard motor 1 and directed to elevate the bow of the watercraft 100, is increased in magnitude such that the moment M1 directed to lower the bow of the watercraft 100 is canceled out.

Conversely, when the bow of the watercraft 100 is lowered as shown in FIG. 6C, the position on which the lift F1 acts is shifted forward of the center-of-gravity G1. Accordingly, a moment M2 acts on the watercraft 100 to elevate the bow of the watercraft 100. At this time, during the porpoising inhibiting control, the controller 20 reduces the thrust as indicated by arrow A2. Accordingly, a moment, which is generated by the thrust of the outboard motor 1 and directed to elevate the bow of the watercraft 100, is reduced in magnitude such that the moment M2 directed to elevate the bow of the watercraft 100 is canceled out. As described above, the moment M1, M2, directed to lower/elevate the bow of the watercraft 100, is reduced in magnitude by increase/reduction in thrust of the outboard motor 1. Consequently, the occurrence of porpoising of the watercraft 100 is inhibited.

Preferred embodiments of the present invention have been explained above. However, the present invention is not limited to the preferred embodiments described above, and a variety of changes can be made without departing from the gist of the present invention.

Instead of the outboard motor 1, another type of marine propulsion device such as an inboard engine outboard drive or a jet propulsion device may be used. The structure of the outboard motor 1 is not limited to that in the preferred embodiments described above and may be changed. For example, the drive source 2 is not limited to the internal combustion engine, and alternatively, may be an electric motor. Yet alternatively, the drive source 2 may be a hybrid system of an internal combustion engine and an electric motor. The outboard motor 1 is not limited in number to one. The outboard motor 1 may be two or more in number.

The formula for calculating the thrust is not limited to that in the preferred embodiments described above and may be changed. For example, in the preferred embodiments described above, the formula for calculating the thrust includes the pitch angle of the watercraft 100 and the pitch angular velocity thereof. However, the pitch angle of the watercraft 100 may be omitted from the formula for calculating the thrust. Alternatively, the pitch angular velocity may be omitted from the formula for calculating the thrust. Another variable may be added to the formula for calculating the thrust. The posture of the outboard motor 1 may be obtained not only from the trim angle but also from another parameter such as the pitch angle of the outboard motor 1.

The porpoising inhibiting control may include not only controlling the thrust but also controlling the trim angle. In other words, the controller 20 may inhibit the occurrence of porpoising by a combination of controlling the thrust and controlling the trim angle. In this case, the controller may selectively set either the trim-up direction or the trim-down direction as a trim direction based on the trim angle of the outboard motor 1 and at least either of the pitch angle of the watercraft 100 and the angular velocity of the pitch angle. The controller 20 may cause the outboard motor 1 to perform the trim motion in the trim direction so as to inhibit the occurrence of porpoising.

For example, the controller 20 may set the trim direction based on a first periodic parameter U1 expressed by the following formula (2).

$$U1 = b1 \times (\theta p - \theta p^*) + b2 \times d\theta p + b3 \times (\theta t - \theta t^*) \qquad (2)$$

"θt" indicates the trim angle of the outboard motor 1. "θt*" indicates a target trim angle of the watercraft 100 during navigation. "b1", "b2", and "b3" indicate predetermined coefficients that are set depending on the type and the posture of the watercraft 100 and those of the outboard motor 1. The first periodic parameter U1 periodically varies between −1 and +1 during the occurrence of porpoising of the watercraft 100. When the first periodic parameter U1 is +1, the controller 20 may set the trim-down direction as the trim direction. When the first periodic parameter U1 is −1, the controller 20 may set the trim-up direction as the trim direction.

Figure 7A:
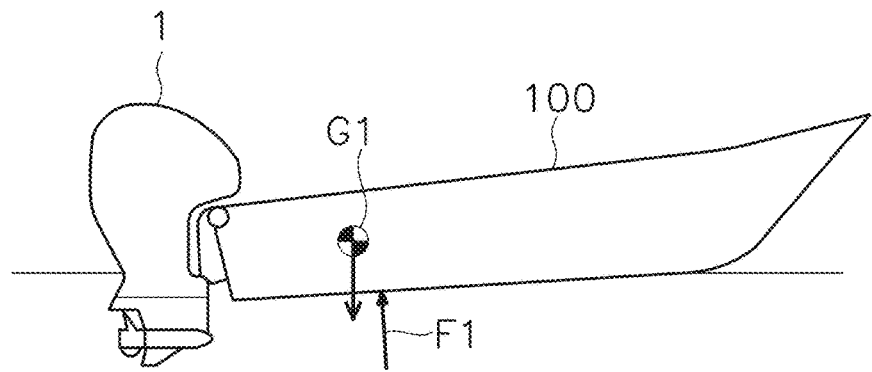
FIG. 7A is a diagram for showing an example of a behavior of the watercraft and a variation in a trim angle of the outboard motor during the occurrence of porpoising.
Figure 7B:
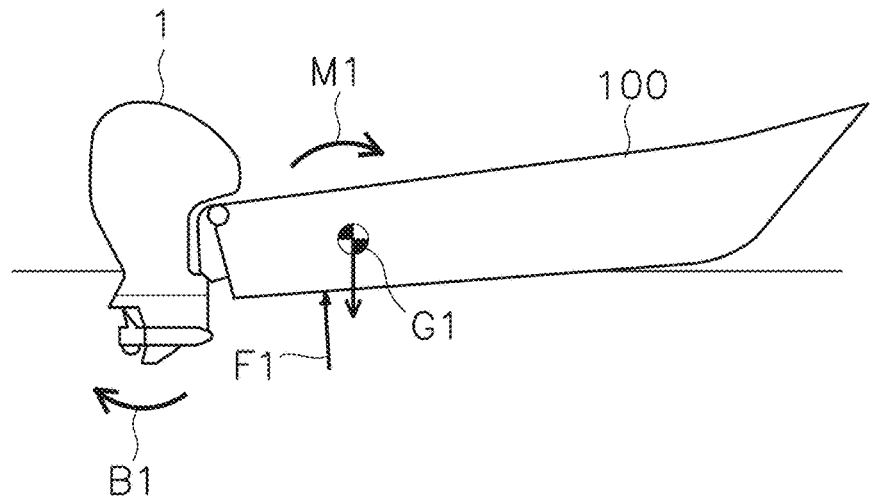
FIG. 7B is a diagram for showing the example of the behavior of the watercraft and a variation in a trim angle of the outboard motor during the occurrence of porpoising.
Figure 7C:
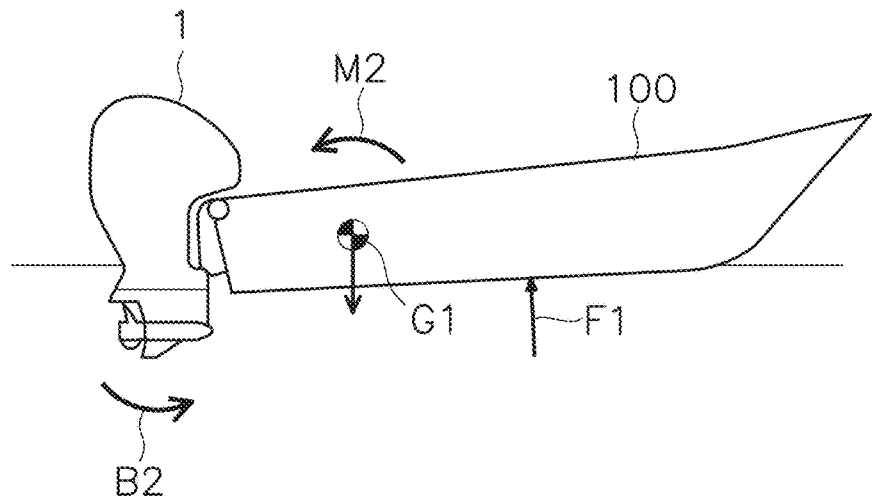
FIG. 7C is a diagram for showing the example of the behavior of the watercraft and a variation in a trim angle of the outboard motor during the occurrence of porpoising.

For example, FIGS. 7A to 7C are diagrams for showing an example of the behavior of the watercraft 100 and the trim motion of the outboard motor 1 during the occurrence of porpoising. During the occurrence of porpoising, as shown in FIG. 7A, the lift F1 acts on a position forward of the center-of-gravity G1 of the watercraft 100 such that the bow of the watercraft 100 is elevated. When the bow of the watercraft 100 is elevated as shown in FIG. 7B, the position on which the lift F1 acts is shifted aft of the center-of-gravity G1. Accordingly, the moment M1 acts on the watercraft 100 to lower the bow of the watercraft 100. At this time, during the porpoising inhibiting control, the controller 20 causes the outboard motor 1 to perform the trim motion in the trim-up direction as indicated by arrow B1. Accordingly, a moment, which is generated by the thrust of the outboard motor 1 and directed to elevate the bow of the watercraft 100, is increased in magnitude such that the moment M1 directed to lower the bow of the watercraft 100 is canceled out.

Conversely, when the bow of the watercraft 100 is lowered as shown in FIG. 7C, the position on which the lift F1 acts is shifted forward of the center-of-gravity G1. Accordingly, the moment M2 acts on the watercraft 100 to elevate the bow of the watercraft 100. At this time, during the porpoising inhibiting control, the controller 20 causes the outboard motor 1 to perform the trim motion in the trim-down direction as indicated by arrow B2. Accordingly, a moment, which is generated by the thrust of the outboard motor 1 and directed to elevate the bow of the watercraft 100, is reduced in magnitude such that the moment M2 directed to elevate the bow of the watercraft 100 is canceled out. As described above, the moment M1, M2, directed to lower/elevate the bow of the watercraft 100, is reduced in magnitude by the trim motion of the outboard motor 1. Consequently, the occurrence of porpoising of the watercraft 100 is inhibited.

The porpoising inhibiting control may include not only controlling the thrust but also controlling a lift position of the outboard motor 1. In other words, the controller 20 may inhibit the occurrence of porpoising by a combination of controlling the thrust and controlling the lift position. In this case, the controller 20 may selectively set either a lift-up direction or a lift-down direction as a lift direction based on the lift position of the outboard motor 1 and at least either of the pitch angle of the watercraft 100 and the angular velocity of the pitch angle. The controller 20 may cause the outboard motor 1 to perform a lift motion in the lift direction so as to inhibit the occurrence of porpoising.

Figure 8A:
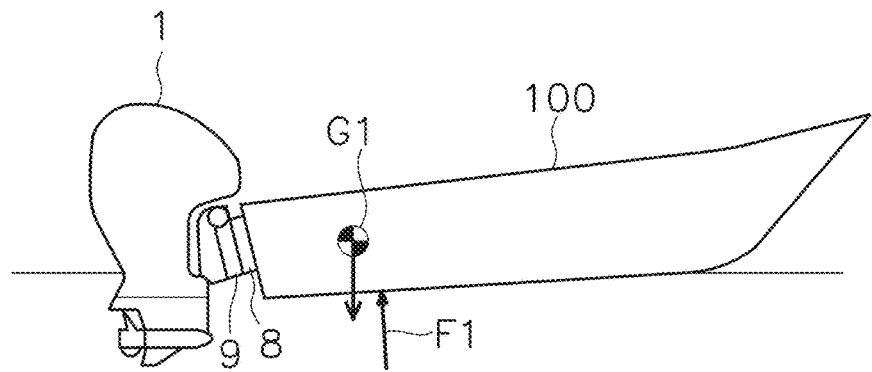
FIG. 8A is a diagram for showing an example of a behavior of the watercraft and a variation in a lift position of the outboard motor during the occurrence of porpoising.

In this case, the outboard motor 1 includes a lift mechanism to move the outboard motor 1 up and down. For example, as shown in FIG. 8A, the lift mechanism includes a first bracket 8 and a second bracket 9. The first and second brackets 8 and 9 slide against each other such that the outboard motor 1 is caused to perform the lift motion up and down. The controller 20 controls a lift actuator (not shown in the drawings) to cause the outboard motor 1 to perform the lift motion. The lift actuator is exemplified by an electric motor, an electric cylinder, a hydraulic motor, or a hydraulic cylinder.

The controller 20 may set the lift direction based on a second periodic parameter U2 expressed by the following formula (3).

$$U2 = c1 \times (\theta p - \theta p^*) + c2 \times d\theta p + c3(Hs - Hs^*) \qquad (3)$$

"Hs" indicates the lift position. "Hs*" indicates a target lift position of the outboard motor 1 during navigation. "c1", "c2", and "c3" indicate predetermined coefficients that are set depending on the type and the posture of the watercraft 100 and those of the outboard motor 1. The second periodic parameter U2 periodically varies between a negative value and a positive value during the occurrence of porpoising of the watercraft 100. When the second periodic parameter U2 is greater than 0, the controller 20 may set the lift-up direction as the lift direction. When the second periodic parameter U2 is less than 0, the controller 20 may set the lift-down direction as the lift direction.

Figure 8B:
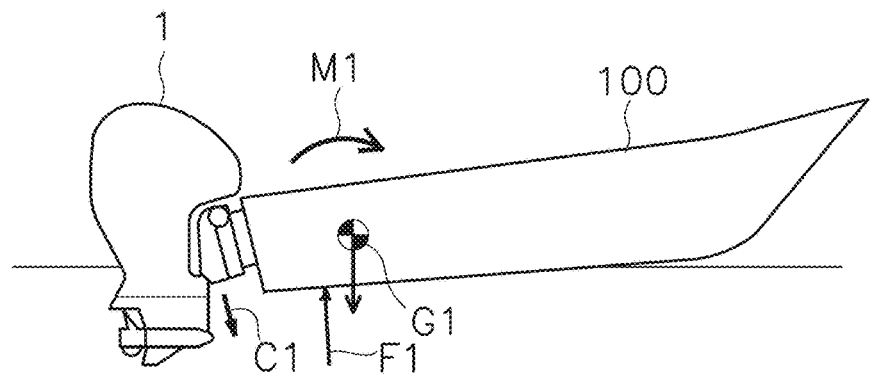
FIG. 8B is a diagram for showing the example of the behavior of the watercraft and a variation in a lift position of the outboard motor during the occurrence of porpoising.
Figure 8C:
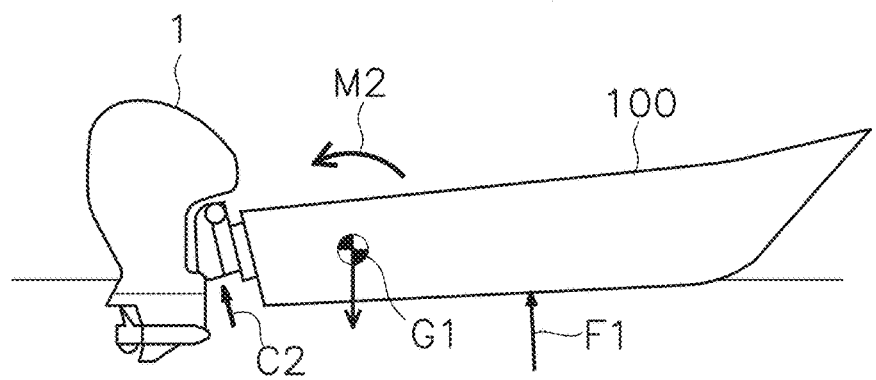
FIG. 8C is a diagram for showing the example of the behavior of the watercraft and a variation in a lift position of the outboard motor during the occurrence of porpoising.

For example, FIGS. 8A to 8C are diagrams for showing an example of the behavior of the watercraft 100 and the lift motion of the outboard motor 1 during the occurrence of porpoising. During the occurrence of porpoising, as shown in FIG. 8A, the lift F1 acts on a position forward of the center-of-gravity G1 of the watercraft 100 such that the bow of the watercraft 100 is elevated. When the bow of the watercraft 100 is elevated as shown in FIG. 8B, the position on which the lift F1 acts is shifted aft of the center-of-gravity G1. Accordingly, the moment M1 acts on the watercraft 100 to lower the bow of the watercraft 100. At this time, during the porpoising inhibiting control, the controller 20 causes the outboard motor 1 to perform the lift motion in the lift-down direction as indicated by arrow C1. Accordingly, a moment, which is generated by the thrust of the outboard motor 1 and directed to elevate the bow of the watercraft 100, is increased in magnitude such that the moment M1 directed to lower the bow of the watercraft 100 is canceled out.

Conversely, when the bow of the watercraft 100 is lowered as shown in FIG. 8C, the position on which the lift F1 acts is shifted forward of the center-of-gravity G1. Accordingly, the moment M2 acts on the watercraft 100 to elevate the bow of the watercraft 100. At this time, during the porpoising inhibiting control, the controller 20 causes the outboard motor 1 to perform the lift motion in the lift-up direction as indicated by arrow C2. Accordingly, a moment, which is generated by the thrust of the outboard motor 1 and directed to elevate the bow of the watercraft 100, is reduced in magnitude such that the moment M2 directed to elevate the bow of the watercraft 100 is canceled out. As described above, the moment M1, M2, directed to lower/elevate the bow of the watercraft 100, is reduced in magnitude by the lift motion of the outboard motor 1. Consequently, the occurrence of porpoising of the watercraft 100 is inhibited.

The controller 20 may inhibit the occurrence of porpoising by a combination of controls described above, including controlling the thrust, controlling the trim angle, and controlling the lift position. It should be noted that during the porpoising inhibiting control, the controller 20 may obtain the trim angle, the lift position, and the thrust of the outboard motor 1 and may calculate the coefficients a1 to a3, b1 to b3, and c1 to c3 described above based on the trim angle, the lift position, and the thrust of the outboard motor 1.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A system for controlling a behavior of a watercraft, the system comprising:
    an outboard motor attachable to the watercraft and including a propeller shaft and a drive source to drive the propeller shaft;
    a pitch angle sensor to detect at least either of a pitch angle of the watercraft and an angular velocity of the pitch angle; and
    a controller configured or programmed to:
        control the drive source such that a thrust of the outboard motor varies;
        obtain the at least either of the pitch angle of the watercraft and the angular velocity of the pitch angle;
        obtain a present thrust of the outboard motor;
        set a target thrust of the outboard motor based on the present thrust of the outboard motor and at least either of the pitch angle of the watercraft and the angular velocity of the pitch angle; and
        control the drive source such that the thrust of the outboard motor becomes the target thrust.

2. The system according to claim 1, wherein the controller is configured or programmed to set the target thrust to inhibit a pitch directional motion of a bow of the watercraft.

3. A method of controlling a behavior of a watercraft including an outboard motor including a propeller shaft and a drive source to drive the propeller shaft, the method comprising:
    obtaining at least either of a pitch angle of the watercraft and an angular velocity of the pitch angle;
    obtaining a present thrust of the outboard motor;
    setting a target thrust of the outboard motor based on the present thrust of the outboard motor and at least either of the pitch angle of the watercraft and the angular velocity of the pitch angle; and
    controlling the drive source such that the thrust of the outboard motor becomes the target thrust.

4. The method according to claim 3, wherein the target thrust is set to inhibit a pitch directional motion of a bow of the watercraft.

5. A system for controlling a behavior of a watercraft, the system comprising:
    a marine propulsion device attachable to the watercraft and including a propeller shaft and a drive source to drive the propeller shaft;
    a pitch angle sensor to detect at least either of a pitch angle of the watercraft and an angular velocity of the pitch angle; and
    a controller configured or programmed to:
        control the drive source such that a thrust of the marine propulsion device varies;
        obtain at least either of the pitch angle of the watercraft and the angular velocity of the pitch angle;
        obtain a present thrust of the marine propulsion device;
        set a target thrust of the marine propulsion device based on the present thrust of the marine propulsion device and at least either of the pitch angle of the watercraft and the angular velocity of the pitch angle; and
        control the drive source such that the thrust of the marine propulsion device becomes the target thrust.

6. A watercraft comprising:
    the system according to claim 5.

* * * * *